(12) United States Patent
Mori

(10) Patent No.: US 12,027,659 B2
(45) Date of Patent: Jul. 2, 2024

(54) POWER GENERATING ELEMENT MOUNTING BOARD, BATTERY PACK, ELECTRONIC DEVICE, AND ELECTRIC VEHICLE

(71) Applicant: MURATA MANUFACTURING CO., LTD., Kyoto (JP)

(72) Inventor: Yasushi Mori, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 566 days.

(21) Appl. No.: 17/226,807

(22) Filed: Apr. 9, 2021

(65) Prior Publication Data
US 2021/0226245 A1    Jul. 22, 2021

Related U.S. Application Data

(63) Continuation of application No. PCT/JP2019/036297, filed on Sep. 17, 2019.

(30) Foreign Application Priority Data

Oct. 10, 2018 (JP) ................................. 2018-191356

(51) Int. Cl.
*H01M 10/04* (2006.01)
*H01M 10/052* (2010.01)
(Continued)

(52) U.S. Cl.
CPC .... *H01M 10/0486* (2013.01); *H01M 2220/20* (2013.01); *H01M 2220/30* (2013.01)

(58) Field of Classification Search
CPC ......... H01M 10/0486; H01M 2220/20; H01M 2220/30; H01M 10/425; H01M 6/18;
(Continued)

(56) References Cited

U.S. PATENT DOCUMENTS

2011/0039129 A1\* 2/2011 Lee .................. H01M 10/4257
429/7
2011/0262777 A1\* 10/2011 Choi ................... H01M 50/516
174/68.2
2017/0229733 A1\* 8/2017 Ohwada .............. H01M 10/052

FOREIGN PATENT DOCUMENTS

CN     108028520         5/2018
JP     H05101813    *   4/1993
(Continued)

OTHER PUBLICATIONS

Japanese Office Action issued Dec. 28, 2021 in corresponding Japanese Application No. 2020-550258.
(Continued)

*Primary Examiner* — Lisa S Park
(74) *Attorney, Agent, or Firm* — K&L Gates LLP

(57) ABSTRACT

A power generating element mounting board includes: a power generating element having a first terminal and a second terminal; and a board having a first board terminal connected with the first terminal, a second board terminal connected with the second terminal, and at least a first hole and a second hole. The first hole has a first conductive part provided on a surface of the first hole, the second hole has a second conductive part provided on a surface of the second hole. The first hole is provided between the first board terminal and a first outer edge of the board, and the second hole is provided between the second board terminal and a second outer edge of the board.

17 Claims, 17 Drawing Sheets

(51) Int. Cl.
*H01M 10/0562* (2010.01)
*H01M 10/42* (2006.01)
(58) Field of Classification Search
CPC ....... H01M 2300/0068; H01M 10/054; H01M 10/0562; H01M 10/052; Y02E 60/10
See application file for complete search history.

(56) References Cited

FOREIGN PATENT DOCUMENTS

| | | | |
|---|---|---|---|
| JP | H05101813 A | 4/1993 |
| JP | 2553102 B2 | 11/1996 |
| JP | 114027 | 1/1999 |
| JP | 2006059852 A | 3/2006 |
| JP | 2015220100 A | 12/2015 |
| JP | 2017098314 A | 6/2017 |

OTHER PUBLICATIONS

International Search Report for Application No. PCT/JP2019/036297, dated Nov. 26, 2019.
Chinese Office Action issued Aug. 11, 2022 in corresponding Chinese Application No. 201980066128.9.

\* cited by examiner

POWER GENERATING ELEMENT MOUNTING BOARD, BATTERY PACK, ELECTRONIC DEVICE, AND ELECTRIC VEHICLE

CROSS REFERENCE TO RELATED APPLICATIONS

The present application is a continuation of PCT patent application no. PCT/JP2019/036297, filed on Sep. 17, 2019, which claims priority to Japanese patent application no. JP2018-191356 filed on Oct. 10, 2018, the entire contents of which are being incorporated herein by reference.

BACKGROUND

The present technology generally relates to a power generating element mounting board, a battery pack, an electronic device, and an electric vehicle.

There has been proposed a configuration for relieving stress applied to electronic components mounted on a board.

SUMMARY

In the conventional technology, a pattern on a board is divided by the slits, there is a possibility that a sufficient pattern width cannot be secured when a large current flows.

Therefore, an object of the present technology is to provide a power generating element mounting board that can relieve the stress applied to components on a board, and meanwhile, can suppress a voltage drop or heat generation even when a large current (for example, about several amperes (A)) flows from the components connected to a pattern on the board, and to provide a battery pack, an electronic device, and an electric vehicle.

According to an embodiment of the present technology, a power generating element mounting board is provided. The power generating element mounting board includes:
  a power generating element having a first terminal and a second terminal; and
  a board having a first board terminal connected with the first terminal, a second board terminal connected with the second terminal, and at least a first hole and a second hole, wherein
  the first hole includes a first conductive part provided on a surface of the first hole,
  the second hole includes a second conductive part provided on a surface of the second hole,
  the first hole is provided between the first board terminal and a first outer edge of the board, and
  the second hole is provided between the second board terminal and a second outer edge of the board.

According to an embodiment of the present technology, a battery pack having the power generating element mounting board described herein is provided.

According to an embodiment of the present technology, an electronic device having the battery pack described herein is provided.

According to an embodiment of the present technology, an electric vehicle having the battery pack described herein is provided.

According to an embodiment of the present technology, the stress applied to the components on the board can be relieved, and the voltage drop or heat generation can be suppressed even when a large current flows from the components connected to the pattern on the board. The effects exemplified in the present description are examples, and the contents of the present technology are not limitedly interpreted by the effects.

DETAILED DESCRIPTION

Figure 1:
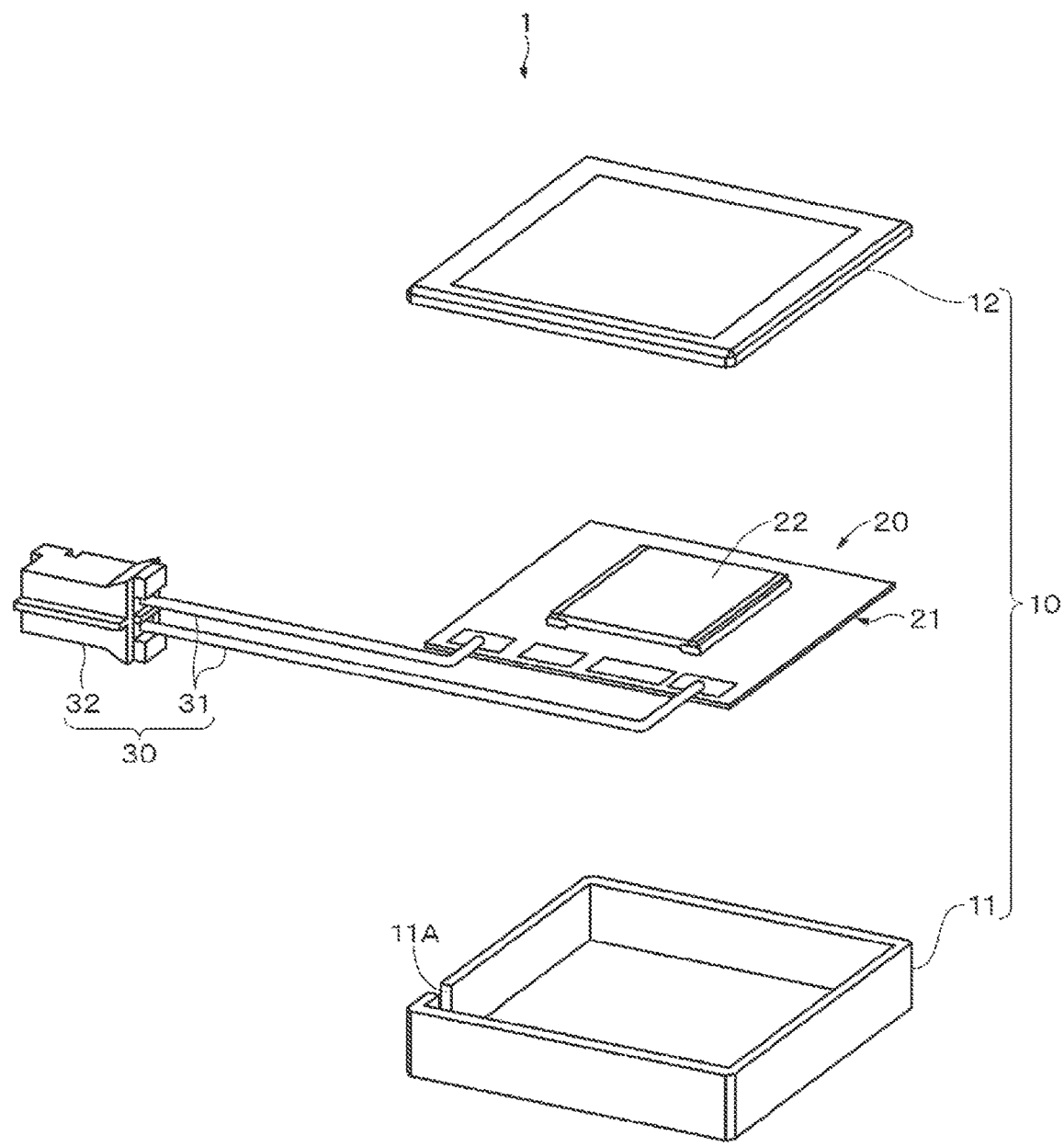
FIG. 1 is an exploded perspective view for explaining a configuration example of a battery pack according to an embodiment of the present technology.

As described herein, the present disclosure will be described based on examples with reference to the drawings, but the present disclosure is not to be considered limited to the examples, and various numerical values and materials in the examples are considered by way of example.

The embodiments and others described below are preferred specific examples of the present technology, and the contents of the present technology are not limited to these embodiments and others. In addition, the embodiments, modified examples, and application examples described below can be combined as appropriate. Further, in each of the embodiments and modified examples, the configurations of the same or the same quality are designated by the same reference numerals, and duplicate description are omitted as appropriate.

As shown in FIG. 1, the battery pack 1 according to an embodiment of the present technology includes an exterior case 10, a power generating element mounting board 20 accommodated in the exterior case 10, and a cable connector 30 connected to the power generating element mounting board 20.

The exterior case 10 includes a case body 11 having a thin box shape with one main face open, and a lid 12 provided so as to close the one main face that is opened. The case body 11 has a notch 11A in a peripheral wall, and the cable connector 30 is led out from the notch 11A. The exterior case 10 is made of, for example, a polymer resin or metal.

The cable connector 30 includes a cable 31 and a connector 32 provided at one end of the cable 31. The other end of the cable 31 is connected to the power generating element mounting board 20. The connector 32 is configured to be connectable to an electronic device or the like.

The power generating element mounting board 20 includes a flat plate-shaped printed circuit board (hereinafter, simply referred to as the "board") 21 and a rectangular thin plate-shaped battery 22 provided on one surface of the board 21.

Figure 2A:
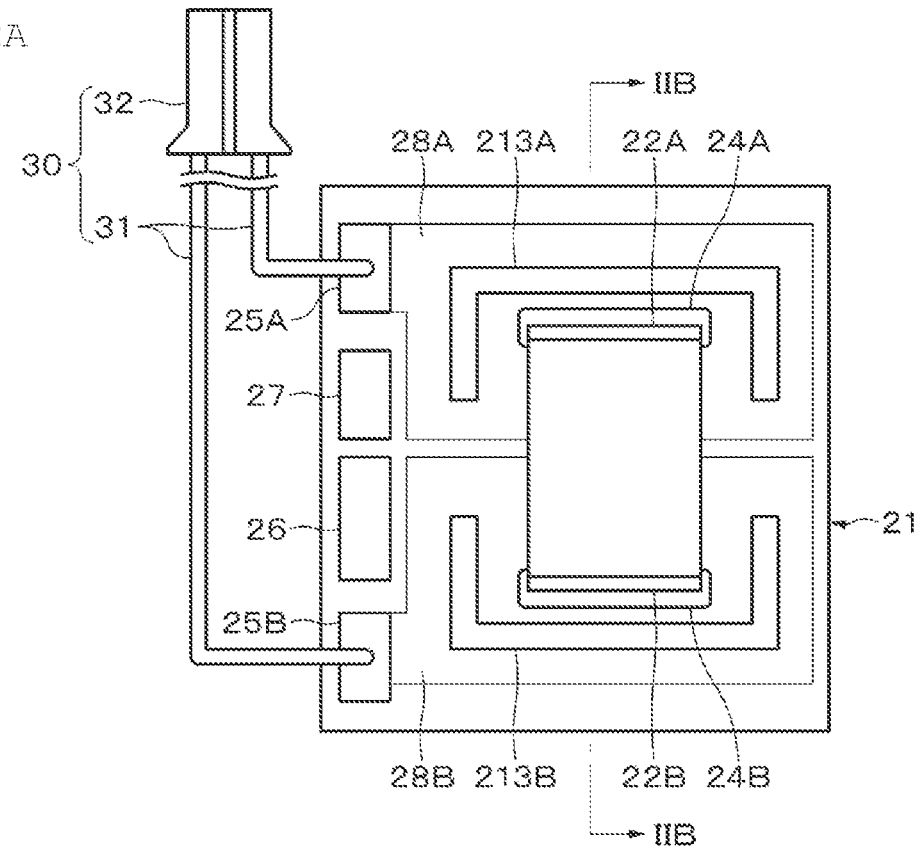
FIG. 2A is a top view of a board according to an embodiment of the present technology and a cable connector connected to the board as viewed from above.
Figure 2B:
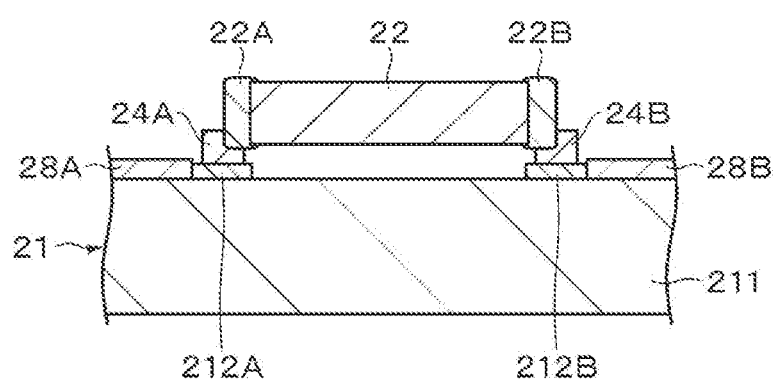
FIG. 2B is a partial sectional view showing a section of a part when the board is cut along a line IIB-IIB in FIG. 2A.

FIG. 2A is a top view of the board 21 and the cable connector 30 connected to the board 21 as viewed from above, and FIG. 2B is a partial sectional view showing a section of a part when the board 21 is cut along a line IIB-IIB in FIG. 2A. As shown in FIGS. 2A and 2B, the board 21 has a board body 211, a first pad 212A (first board terminal) and a second pad 212B (second board terminal) provided on one surface of the board body 211, and first and second holes 213A and 213B. The pad is also called a land.

On one surface of the board body 211, in addition to the first and second pads 212A and 212B, there are provided solders 24A and 24B, a positive terminal 25A, a negative terminal 25B, a protection integrated circuit (IC) 26 and a charge/discharge field effect transistor (FET) 27, a first surface layer pattern 28A which is a wiring pattern connecting the positive terminal 25A and a positive electrode terminal of the battery 22, and a second surface layer pattern 28B which is a wiring pattern connecting the negative terminal 25B and a negative electrode terminal of the battery 22. Although not shown, a coverlay or a resist layer (protective layer) may be formed on the surface (for example, both sides) of the board body 211.

The board body 211 is a rigid board having insulating properties. Specific examples of the board body 211 include a paper phenol board, a paper epoxy board, a glass composite board, a glass epoxy board, a Teflon (registered trademark) board, an alumina (ceramics) board, a low temperature co-fired ceramics (LTCC) board, a composite board, and a halogen-free board, but the present technology is not limited to these boards.

The first and second pads 212A and 212B are at locations where the terminals of the battery 22 are provided, for example, by soldering. The first and second pads 212A and 212B are formed by patterning a copper foil into a predetermined shape.

The first and second holes 213A and 213B are holes formed in the thickness direction of the board 21 and penetrating the board body 211. The first and second holes 213A and 213B includes a first conductive part and a second conductive part, respectively (not shown here, but corresponds to 51A and 51B in FIGS. 6, 11 and 12, respectively) which are formed by such as laser processing or drilling on the board body 211, and then performing such as plating on the surfaces thereof. The first and second holes 213A and 213B according to the embodiment are holes having a U-shape and whose ends are arranged so as to face each other. The first and second holes 213A and 213B according to the embodiment have a shape that is substantially symmetrical with respect to a straight line passing near the center of the board body 211.

Although details are described later, each of the first and second holes 213A and 213B in the embodiment is filled with a conductive resin or inserted with an elastic body (via) having conductivity.

The battery 22 has a positive electrode terminal (first terminal) 22A and a negative electrode terminal (second terminal) 22B connected to the first and second pads 212A and 212B, respectively. As shown in FIG. 2A, the battery 22 has a rectangular shape in top view, and has a pair of short sides and a pair of long sides in top view, and has a positive electrode terminal 22A and a negative electrode terminal 22B formed at portions on the pair of short sides, respectively. Needless to say, the positive electrode terminal 22A and the negative electrode terminal 22B may be formed at portions on the pair of long sides.

As shown in FIG. 2B, the positive electrode terminal 22A is soldered to the first pad 212A with the solder 24A, and the negative electrode terminal 22B is soldered to the second pad 212B with the solder 24B. The solders 24A and 24B are lead-free solder such as solder paste.

The battery 22 is an example of a power generating element, and specifically, is a bulk type all-solid-state battery. Specific examples of the all-solid-state battery include an all-solid-state lithium battery, an all-solid-state sodium battery, an all-solid-state potassium battery, an all-solid-state magnesium battery, and an all-solid-state calcium battery, and among the above, the all-solid-state lithium battery is preferable, but the battery is not limited to the above batteries. Further, the solid electrolyte may be crystalline or amorphous (glass), and from a different point of view, may be an oxide-based, a sulfide-based material, or another material. Here, the case in which the battery 22 is a secondary battery is described, but the battery 22 may be a primary battery.

Figure 3:
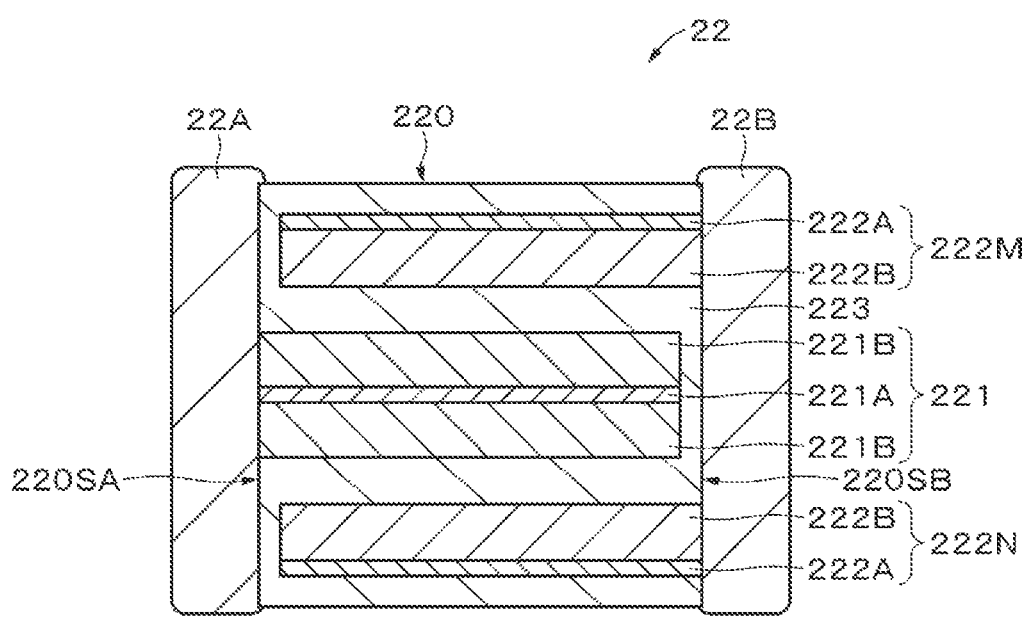
FIG. 3 is a diagram for explaining an internal configuration example of a battery according to an embodiment of the present technology.

FIG. 3 is a diagram for explaining an example of the internal configuration of the battery 22. The battery 22 has a rectangular thin plate-shaped battery element 220, and the positive electrode terminal 22A and the negative electrode terminal 22B provided on opposite end faces 220SA and 220SB of the battery element 220, respectively. The battery 22 may further include an exterior material (not shown) that covers the surface of the battery element 220 other than the end faces 220SA and 220SB.

The battery element 220 has a positive electrode layer 221, negative electrode layers 222M and 222N, and a solid electrolyte 223. The negative electrode layer 222M is provided such that one main face thereof faces one main face of the positive electrode layer 221, and the solid electrolyte 223 is provided between the negative electrode layer 222M and the positive electrode layer 221. The negative electrode layer 222N is provided such that one main face thereof faces the other main face of the positive electrode layer 221, and the solid electrolyte 223 is provided between the negative electrode layer 222N and the positive electrode layer 221.

The solid electrolyte 223 covers the peripheral face of the positive electrode layer 221 such that a part of the peripheral face of the positive electrode layer 221 is exposed from the end face 220SA of the battery element 220, whereas the other peripheral face is not exposed from the surface of the battery element 220. A part of the peripheral face of the positive electrode layer 221 exposed from the end face 220SA of the battery element 220 is in contact with the positive electrode terminal 22A.

The solid electrolyte 223 covers the peripheral faces of the negative electrode layers 222M and 222N such that a part of the peripheral faces of each of the negative electrode layers 222M and 222N is exposed from the end face 220SB of the battery element 220, whereas the other peripheral faces are not exposed from the surface of the battery element 220. A part of the peripheral faces of the negative electrode layers 222M and 222N exposed from the end face 220SB of the battery element 220 is in contact with the negative electrode terminal 22B. The solid electrolyte 223 may cover the other main faces of the negative electrode layers 222M and 222N.

The positive electrode layer 221 has a positive electrode current collector 221A and positive electrode active material layers 221B provided on both main faces of the positive electrode current collector 221A. The negative electrode layers 222M and 222N each has a negative electrode current collector 222A and a negative electrode active material layer 222B provided on one main face of the negative electrode current collector 222A. Each of the negative electrode layers 222M and 222N is provided such that the negative electrode active material layer 222B faces the positive electrode active material layer 2221B.

Figure 4:
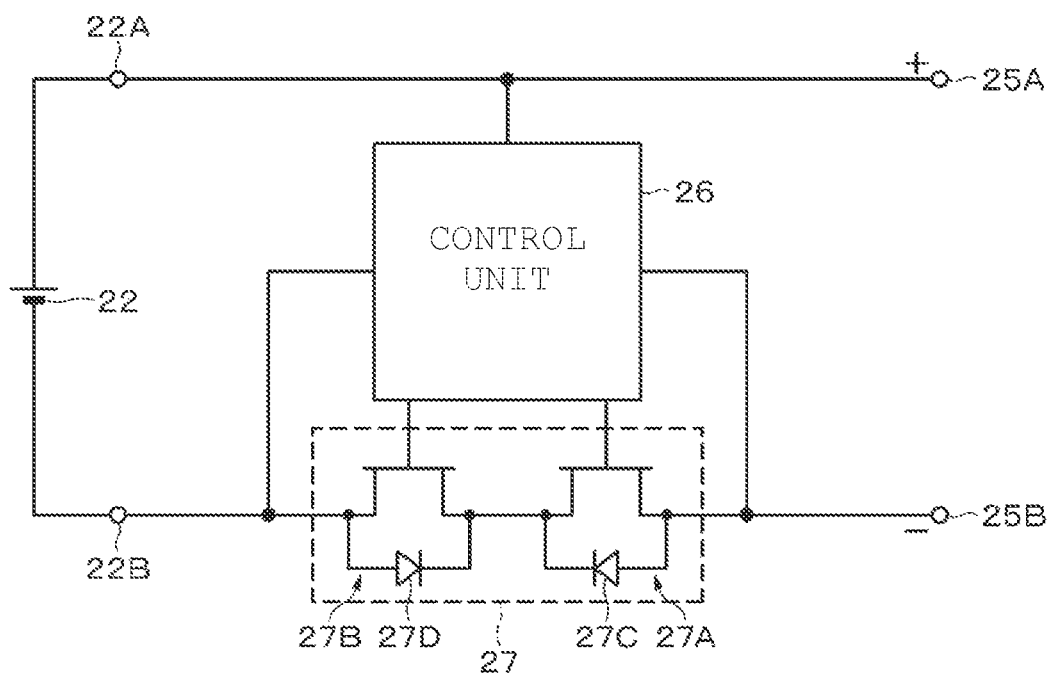
FIG. 4 is a circuit diagram showing a circuit configuration example of the battery pack according to an embodiment of the present technology.

A circuit configuration example of the battery pack 1 according to the embodiment is described with reference to FIG. 4. The positive electrode terminal 22A of the battery 22 is connected to the positive terminal 25A of the board 21 by the first surface layer pattern 28A. Further, the negative electrode terminal 22B of the battery 22 is connected to the negative terminal 25B of the board 21 by the second surface layer pattern 28B.

The control unit 26 controls the charge/discharge operation of the battery 22 by controlling the charge/discharge FET 27. Further, by controlling the charge/discharge FET 27, the control unit 26 controls the charge/discharge operation so as to prevent the charging voltage from becoming excessive during charging and discharging, an overcurrent due to load short circuit from flowing, and an overdischarge from occurring.

The charge/discharge FET 27 includes a charge control FET 27A and a discharge control FET 27B. The charge control FET 27A and the discharge control FET 27B are on/off controlled based on the control of the control unit 26.

A parasitic diode 27C and a parasitic diode 27D are connected between the drain and the source of the charge control FET 27A and the discharge control FET 27B, respectively. The parasitic diode 27C has an opposite polarity to the charging current and a forward polarity to the discharging current. The parasitic diode 27D has a forward polarity to the charging current and an opposite polarity to the discharging current.

Control signals from the control unit 26 are supplied to the gates of the charge control FET 27A and the discharge control FET 27B, respectively. The charge control FET 27A and the discharge control FET 27B are P-channel type, and are turned on by a gate potential lower than the source potential by a predetermined value or more. During charging and discharging, the charge control FET 27A and the discharge control FET 27B are turned on.

In addition, an FET of N-channel type may be used as the charge control FET 27A and the discharge control FET 27B. When the N-channel FET is used, the charge control FET 27A and the discharge control FET 27B are turned on by a gate potential higher than the source potential by a predetermined value or more.

Figure 5:
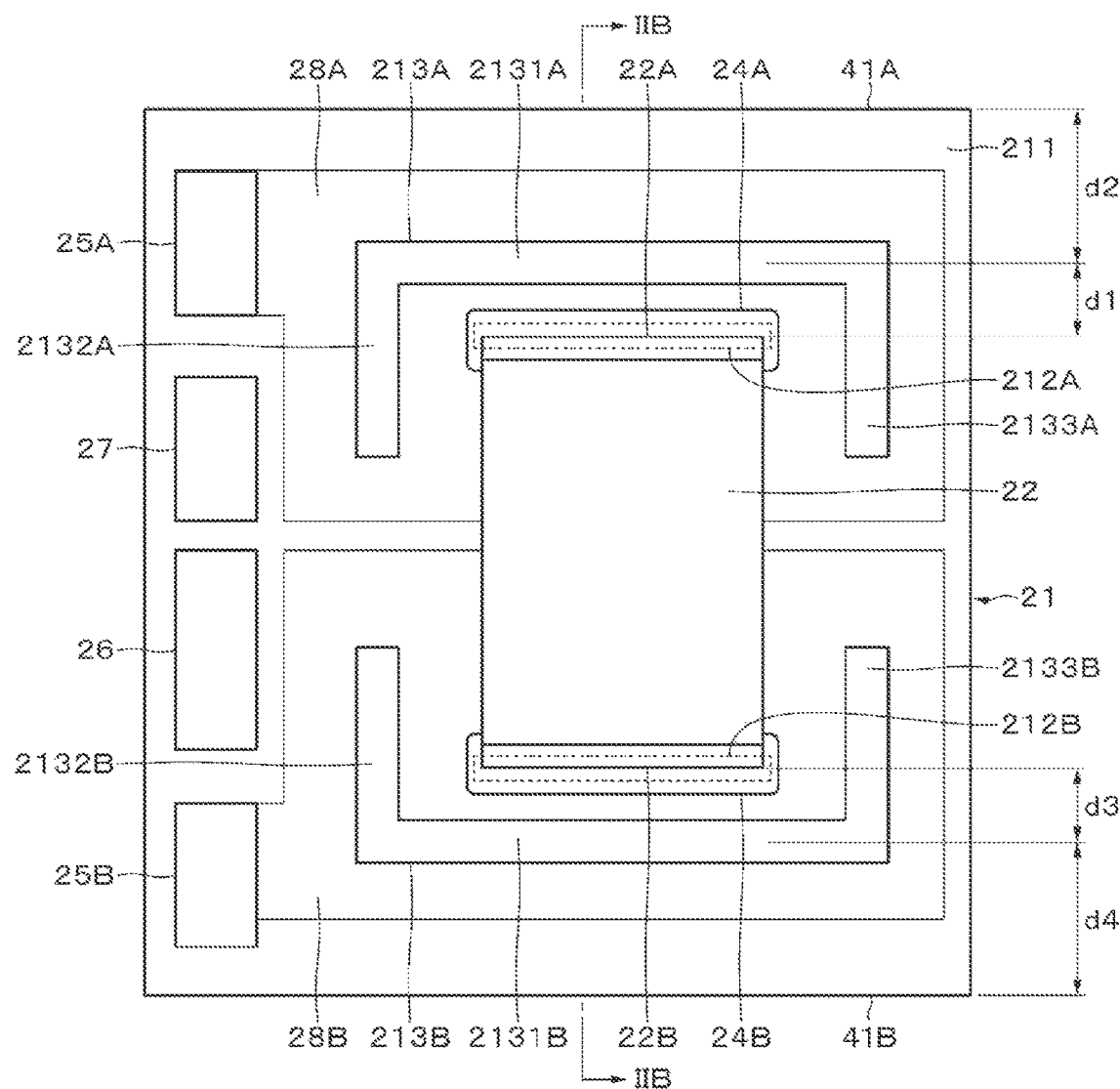
FIG. 5 is a top view of the board according to an embodiment of the present technology as viewed from above.
Figure 6:
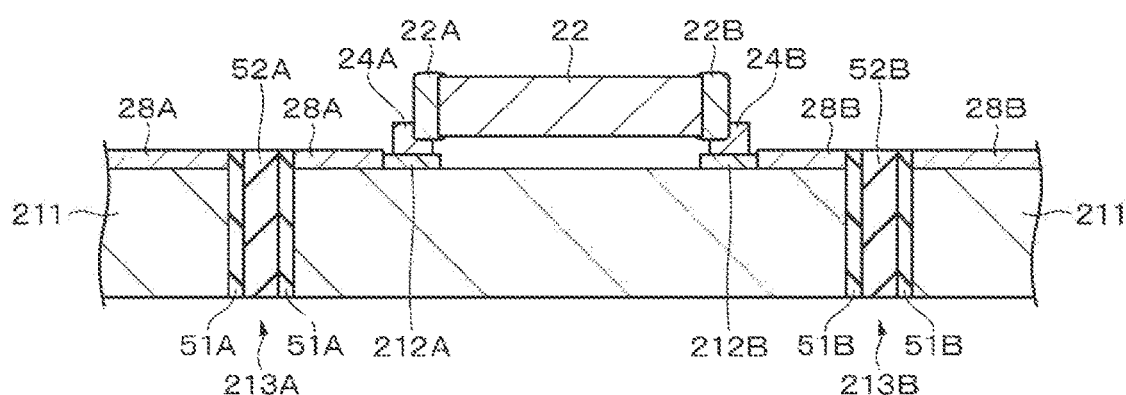
FIG. 6 is a sectional view showing a section when the board is cut along a cutting line IIB-IIB in FIG. 5.

Next, specific examples of the first and second holes 213A and 213B are described with reference to FIGS. 5 and 6. FIG. 5 is a top view of the board 21 as viewed from above, and FIG. 6 is a sectional view showing a section when the board 21 is cut along a cutting line IIB-IIB in FIG. 5. In the following description, specific values are shown for convenience of explanation and easy understanding, but needless to say, the content of the present technology is not limited to the exemplified values.

The board body 211 has, for example, a square shape when viewed from above, and has the size of about 20.0 mm in length by 20.0 mm in width with respect to the direction toward the paper surface of FIG. 5. As described above, the battery 22 has a rectangular shape when viewed from above, and has the size of about 10.0 mm in length by 5.0 mm in width. The width of each of the first and second pads 212A and 212B is about 1.0 mm, and the width of each of the first and second holes 213A and 213B is also about 1.0 mm.

The board body 211 has a first outer edge 41A as an outer edge facing the positive electrode terminal 22A connected to the first pad 212A. The first outer edge 41A is substantially parallel to the positive electrode terminal 22A and is an outer edge on the side that is closer to the positive electrode terminal 22A.

The first hole 213A is formed at least between the positive electrode terminal 22A and the first outer edge 41A in the board body 211. For example, a strip-shaped hole 2131A substantially parallel to the first outer edge 41A is formed between the positive electrode terminal 22A and the first outer edge 41A in the board body 211. The length of the hole 2131A is set to be equal to or greater than the length of the short side of the battery 22. From both ends of the hole 2131A, holes 2132A and 2133A are formed so as to be substantially orthogonal to the extending direction of the hole 2131A and extend in the direction toward the inside of the board body 211. The first hole 213A is constituted of the holes 2131A, 2132A, and 2133A.

The board body 211 has a second outer edge 41B as an outer edge facing the negative electrode terminal 22B connected to the second pad 212B. The second outer edge 41B is substantially parallel to the negative electrode terminal 22B and is an outer edge on the side that is closer to the negative electrode terminal 22B.

The second hole 213B is formed at least between the negative electrode terminal 22B and the second outer edge 41B in the board body 211. For example, a strip-shaped hole 2131B substantially parallel to the second outer edge 41B is formed between the negative electrode terminal 22B and the second outer edge 41B of the board body 211. The length of the hole 2131B is set to be equal to or greater than the length of the short side of the battery 22. From both ends of the hole 2131B, holes 2132B and 2133B are formed so as to be substantially orthogonal to the extending direction of the hole 2131B and extend in the direction toward the inside of the board body 211. The second hole 213B is constituted of the holes 2131B, 2132B, and 2133B.

In the embodiment, each configuration is formed such that a distance d1 from the first pad 212A to the first hole 213A is smaller than a distance d2 from the first hole 213A to the first outer edge 41A. Further, each configuration is formed such that a distance d3 from the second pad 212B to the second hole 213B is smaller than a distance d4 from the second hole 213B to the second outer edge 41B.

Specifically, each of the distances d1 and d3 is set to about 1.0 mm, and each of the distances d2 and d4 is set to about 2.5 mm.

The distance d1 from the first pad 212A to the first hole 213A is defined by, for example, the distance from the center of the first pad 212A to the widthwise center of the hole 2131A in the first hole 213A. The distance d2 from the first hole 213A to the first outer edge 41A is defined by, for example, the distance from the widthwise center of the hole 2131A in the first hole 213A to the first outer edge 41A.

Further, the distance d3 from the second pad 212B to the second hole 213B is defined by, for example, the distance from the center of the second pad 212B to the widthwise center of the hole 2131B in the second hole 213B. The distance d4 from the second hole 213B to the second outer edge 41B is defined by, for example, the distance from the widthwise center of the hole 2131B in the second hole 213B to the second outer edge 41B. It should be noted that these are examples, and the distances d1 to d4 may be defined by the distances between other parts.

As shown in FIG. 6, the first hole 213A has a first conductive part 51A formed on the surface by such as a plating treatment. The first conductive part 51A is connected to the first surface layer pattern 28A. Further, the second hole 213B has a second conductive part 51B formed on the surface by such as a plating treatment. The second conductive part 51B is connected to the second surface layer pattern 28B.

The first hole 213A is filled with a first conductive resin 52A. Also, the second hole 213B is filled with a second conductive resin 52B. The first and second conductive resins 52A and 52B are, for example, a conductive resin. As the first and second conductive resins 52A and 52B, for example, a low-temperature curable flexible conductive adhesive (trade name "SX-ECA48") can be applied. The first and second conductive resins 52A and 52B may be elastic bodies (vias) having conductivity. The via means a conductor (for example, a cylindrical conductor) that is inserted into the hole and connects layers to each other.

Examples of the effects obtained by the first embodiment described above are described.

By providing the first and second holes in the board body, the stress due to the deformation is prevented as much as possible from propagating to the battery when the board body is deformed in the assembling process or the like of the battery pack.

Further, by forming the first hole between the positive electrode terminal connected to the first pad and the first outer edge of the board, and forming the second hole between the negative electrode terminal connected to the second pad and the second outer edge of the board, the stress applied to the portion where the battery is connected to the board can be effectively reduced. Therefore, the battery can be prevented from peeling off from the board or being damaged.

Further, by setting the dimensional relationship of the distances d1 and d2 as described above, it becomes possible to prevent the case in which a direct force is applied to a portion of the board body between the first pad and the first hole to cause the stress to be applied to the battery without the effect of stress relaxation by the first hole. The same effect can be obtained by setting the dimensional relationship of the distances d3 and d4 as described above. The distances d1 and d3 are preferably made as small as possible.

Further, by forming the first and second conductive parts in the first and second holes, respectively, the area through which the current can flow increases by the area of the first and second conductive parts, so that the wiring resistance can be reduced and the voltage drop and heat generation can be suppressed. This effect is obtained by forming the first and second holes into a through-hole structure. The "through hole" as used herein means a hole that penetrates in the thickness direction of the board and is imparted with conductivity by plating or the like on the surface.

Further, in the embodiment, the first and second conductive resins are filled in the first and second holes, respectively. As a result, the area of the pattern can be further secured while the function of relieving the stress propagating to the battery is maintained, so that the voltage drop and heat generation can be suppressed even when a large current (for example, several A) flows.

Next, the second embodiment is described. The difference between the second embodiment and the first embodiment is that the power generating element mounting board according to the second embodiment has another battery which is a power generating element different from the battery 22.

Figure 7:
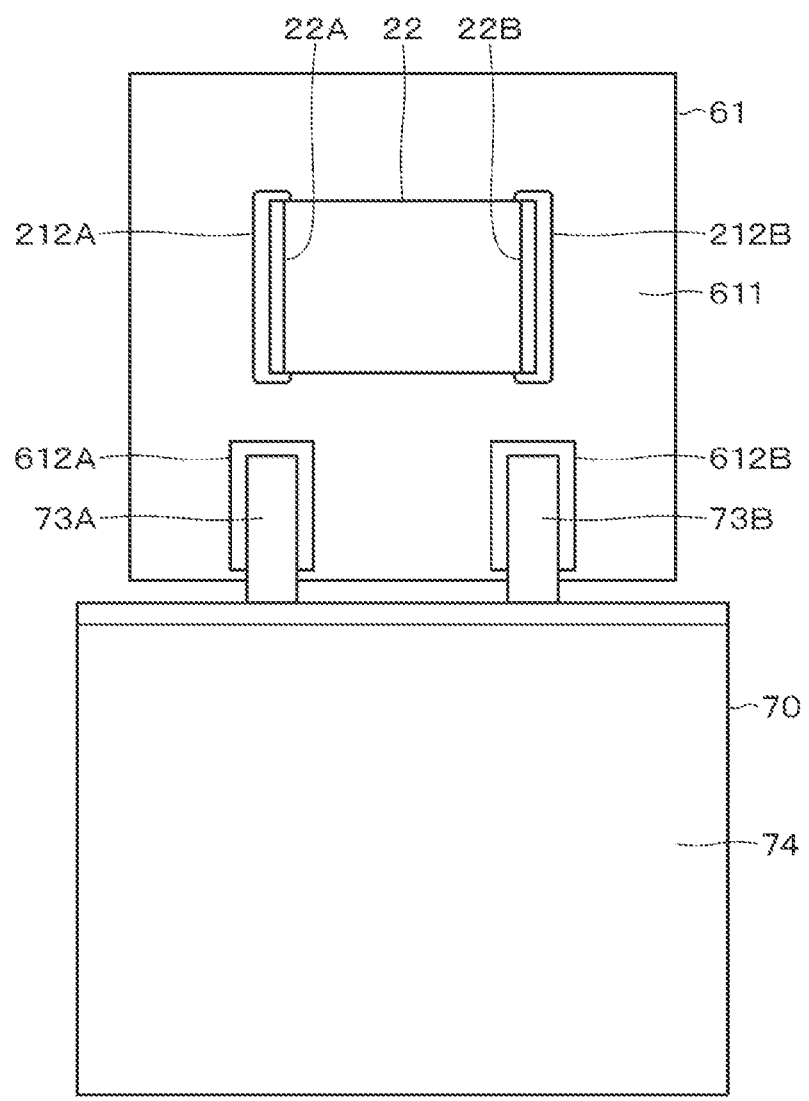
FIG. 7 is a diagram referred to when a problem to be considered in an embodiment is explained.

Here, in order to facilitate the understanding of the second embodiment, the problems to be considered are described. As shown in FIG. 7, a battery 22 is mounted on a board body 611 of a board 61 having a square shape in top view. The battery 22 is mounted, for example, near the center of the board body 611. Although not shown, a positive electrode terminal 22A of the battery 22 is connected to a positive terminal of the board 61, and a negative electrode terminal 22B of the battery 22 is connected to the negative terminal of the board 61 (the positive terminal and the negative terminal are not shown).

A battery 70, which is an example of another power generating element, is connected to the board body 611. The battery 70 is, for example, a so-called laminated battery, in which a flat wound electrode body (not shown) to which a positive electrode tab 73A (third terminal) and a negative electrode tab 73B (fourth terminal) are attached is accommodated inside an exterior member 74. The laminated battery can be made smaller, lighter, and thinner. The positive electrode tab 73A and the negative electrode tab 73B are respectively led out from one side of a sealed portion of the exterior member 74 to the outside in the same direction. The positive electrode tab 73A and the negative electrode tab 73B are each made of metal material such as aluminum (Al), copper (Cu), nickel (Ni) or stainless steel, and have a thin plate shape or a mesh shape, respectively. The exterior member 74 is made of, for example, a flexible laminated film. The exterior member 74 has, for example, a structure in which a heat-sealing resin layer, a metal layer, and a surface protection layer are sequentially laminated. As an electrolytic solution of the battery 70, a liquid electrolyte (that is, an electrolytic solution) or a gel electrolyte can be used.

Instead of the above laminated film, the exterior member 74 may be made of a laminated film having another structure, a polymer film such as polypropylene, or a metal film. Alternatively, a laminated film in which an aluminum film is used as a core material and a polymer film is laminated on one side or both sides thereof may be used.

The board body 611 is provided with a first connection part 612A (third board terminal) and a second connection part 612B. The first connection part 612A is made of a metal plate or the like, and the positive electrode tab 73A of the battery 70 is connected to the first connection part 612A by such as welding. Further, the board body 611 is provided with the second connection part 612B. The second connection part 612B is made of a metal plate or the like, and the negative electrode tab 73B of the battery 70 is connected to the second connection part 612B by such as welding. The first connection part 612A and the second connection part 612B are connected to a predetermined surface layer pattern (not shown) formed on the board body 611, and the first connection part 612A is connected to the positive terminal, and the second connection part 612B is connected to the negative terminal (the positive and negative terminals are not shown), through the surface layer pattern, respectively.

Here, the first connection part 612A is provided at a predetermined position in a direction perpendicular to the first pad 212A (direction vertical to FIG. 7). Further, the second connection part 612B is provided at a predetermined position in a direction perpendicular to the second pad 212B. In the above arrangement, a space on the surface of the board body 611 cannot be effectively utilized, and the size of the board 61 becomes large.

Figure 8:
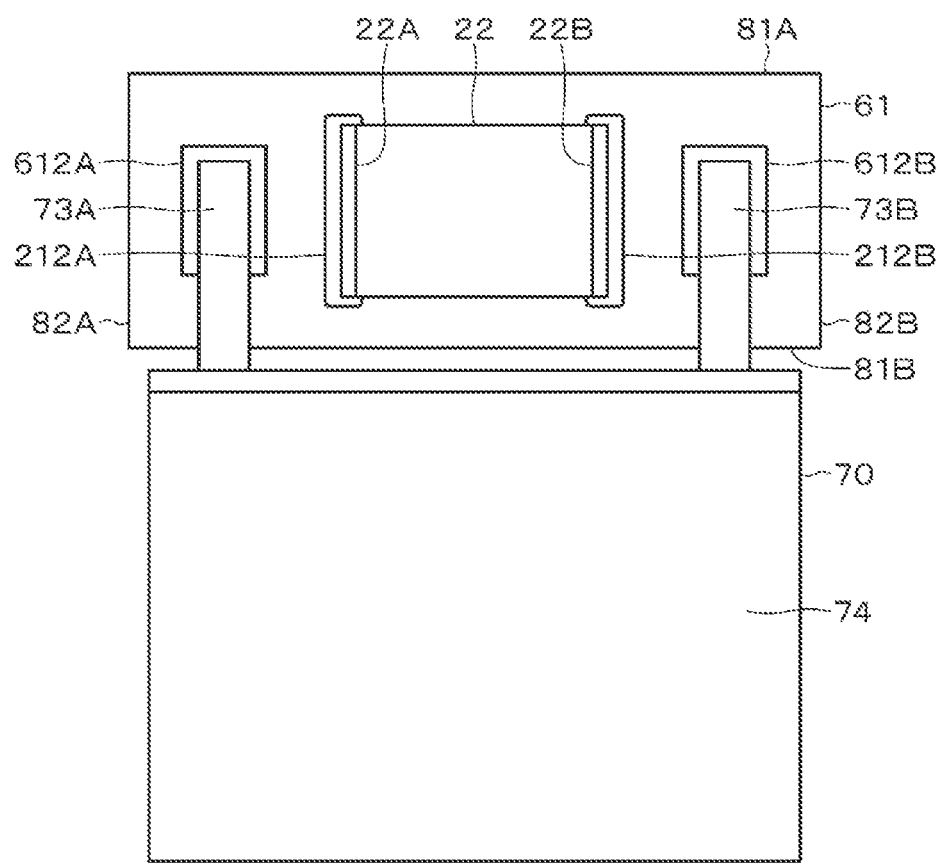
FIG. 8 is a diagram showing an arrangement example of first to fourth board terminals provided on a board according to an embodiment of the present technology.

Therefore, in the second embodiment, as shown in FIG. 8, the board 61 has a rectangular shape when viewed from above. The board 61 has a pair of long sides 81A and 81B, and a pair of short sides 82A and 82B. In the second embodiment, the short side 82A corresponds to the first outer edge, and the short side 82B corresponds to the second outer edge.

In the board 61, the first connection part 612A, the first pad 212A, the second pad 212B, and the second connection part 612B are provided so as to align in this order from the short side 82A side along the direction substantially parallel to the long side 81A and the long side 81B. Then, the positive electrode tab 73A is welded to the first connection part 612A, and the negative electrode tab 73B is welded to the second connection part 612B. After the welding, the battery 22 is located between the positive electrode tab 73A and the negative electrode tab 73B. Note that an amount of extraction of the positive electrode tab 73A from the exterior member 74 is appropriately set so that the positive electrode tab 73A can be welded to the first connection part 612A provided as shown in FIG. 8. The same applies to the negative electrode tab 73B.

Figure 9:
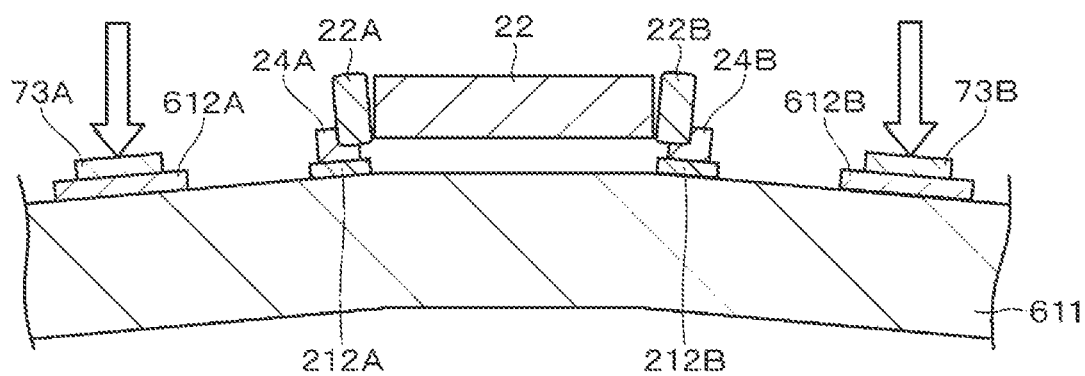
FIG. 9 is a diagram referred to when a problem to be considered in an embodiment is explained.

With the arrangement shown in FIG. 8, the space on the surface of the board body 611 can be effectively utilized, and the size of the board 61 can be suppressed from becoming large. On the other hand, as shown in FIG. 9, there may be a risk of the stress generated when the positive electrode tab 73A and the negative electrode tab 73B of the battery 70 are welded (schematically indicated by arrows in FIG. 9) propagating to the battery 22, and portions of the battery 22 connected to the board 61 or the battery 22 itself being broken.

Figure 10:
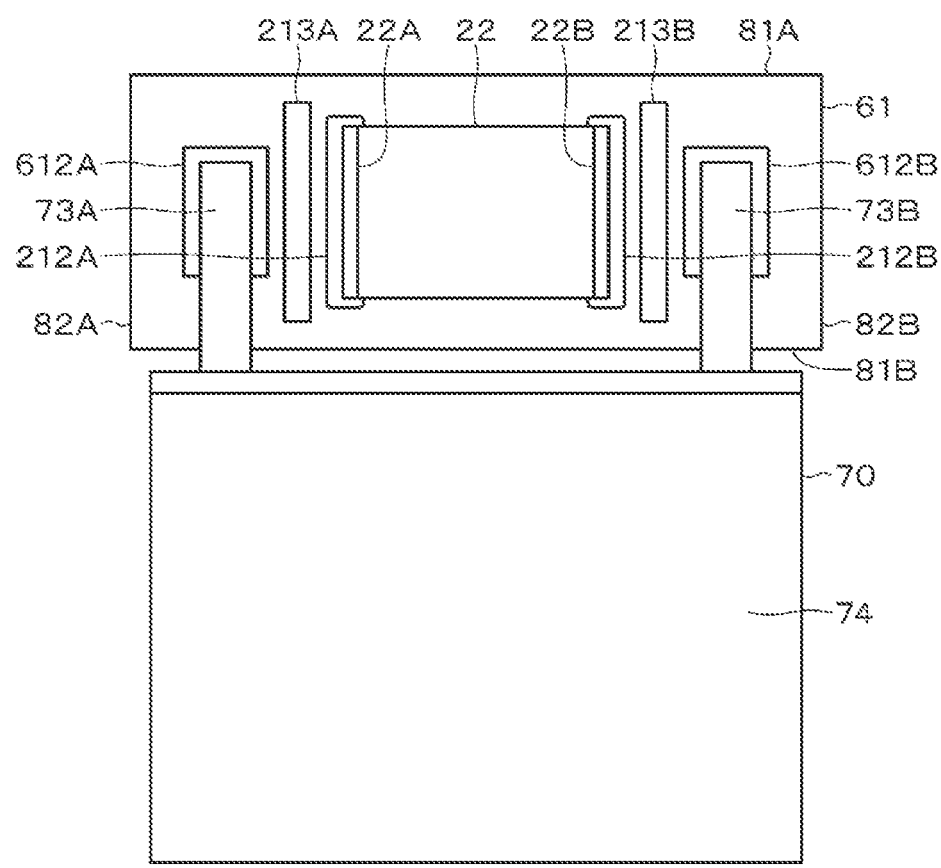
FIG. 10 is a top view of the board according to an embodiment of the present technology as viewed from above.

Therefore, in the second embodiment, as shown in FIG. 10, a first hole 213A is provided between the first pad 212A and the short side 82A and between the first pad 212A and the first connection part 612A. Further, a second hole 213B is provided between the second pad 212B and the short side 82B and between the second pad 212B and the second connection part 612B. The first hole 213A and the second hole 213B have, for example, a linear shape substantially parallel to the short side 82A and the short side 82B. Further, as described in the first embodiment, the first hole 213A has a first conductive part 51A, and the inside thereof is filled with a first conductive resin 52A. The second hole 213B has a second conductive part 51B, and the inside thereof is filled with a second conductive resin 52B.

Figure 11:
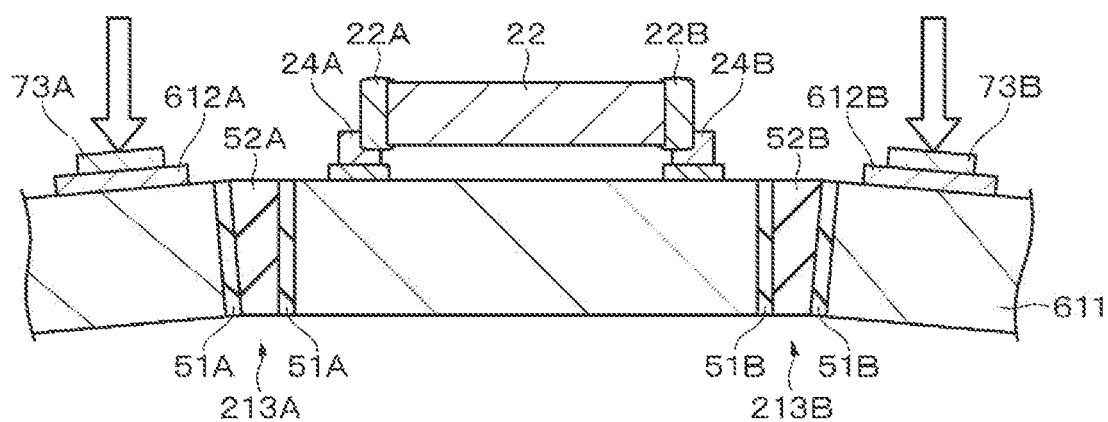
FIG. 11 is a diagram referred to when the effect obtained by an embodiment is explained.

By providing the first hole 213A and the second hole 213B at the above-described positions, as shown in FIG. 11, the stress applied to the board 61 at the time of welding the positive electrode tab 73A and the negative electrode tab 73B can be blocked by the first hole 213A and the second hole 213B. Therefore, the battery 22 can be prevented from being broken by the stress generated during the welding of the positive electrode tab 73A and the like, and the battery 22 can be prevented from peeling off from the board 61. Further, as described above, the board 61 can be miniaturized by mounting the battery 22 between the positive electrode tab 73A and the negative electrode tab 73B.

It should be understood that the shapes and lengths of the first hole 213A and the second hole 213B can be appropriately changed as long as the propagation of stress generated during the welding can be blocked.

Although the embodiments of the present technology have been specifically described above, the present technology is not limited to the above-described embodiments, and various modifications based on the technical idea of the present technology are possible. Hereinafter, modified examples are described.

In the above-described embodiments, the case in which the board 21 is a single-sided board has been described, but the type of the board is not limited to this, and may be a double-sided board, a multilayer board, a build-up board, or others. Generally, a build-up board is a board manufactured by using a so-called build-up process, in which a printed circuit board having a multi-layer structure is manufactured by repeating stacking, drilling, wiring formation, and the like for each layer. When a board 21 is a double-sided board, batteries 22 may be provided on both sides, or the batteries 22 may be provided on one side.

Figure 12:
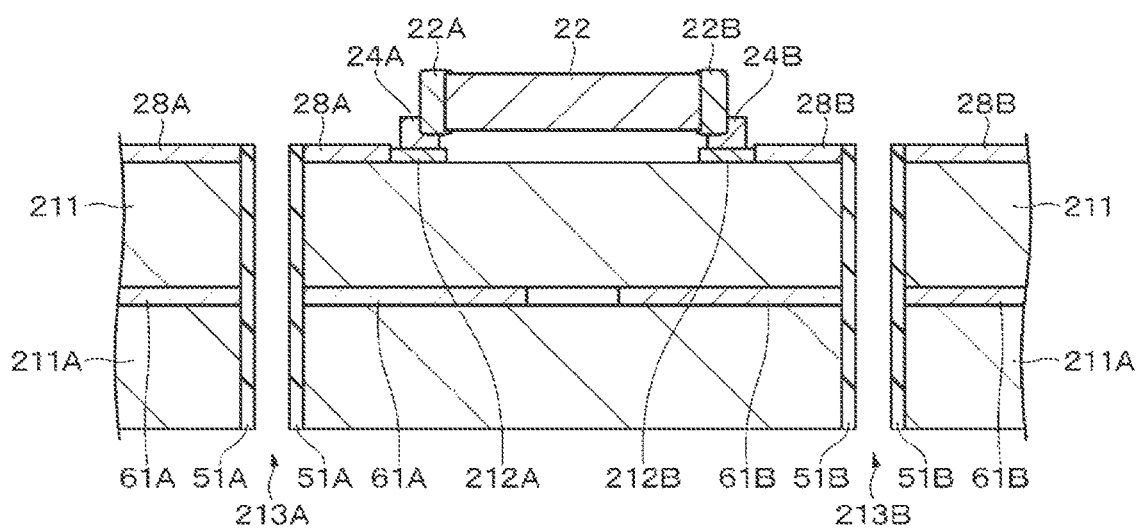
FIG. 12 is a diagram for explaining a modified example according to an embodiment of the present technology.

A specific example when a board 21 is a multilayer board is described. As shown in FIG. 12, the board 21 has a board body 211A (second board) in addition to a board body 211 (first board), and is a multilayer board in which the board body 211 and the board body 211A are laminated. A first surface layer pattern 28A corresponding to a positive electrode terminal 22A and a second surface layer pattern 28B corresponding to a negative electrode terminal 22B are formed on the board body 211. Further, the board body 211A is formed with a first inner layer pattern 61A corresponding to the positive electrode terminal 22A and a second inner layer pattern 62B corresponding to a negative electrode terminal 22B.

The first surface layer pattern 28A and the first inner layer pattern 61A are electrically connected by a first conductive part 51A, and these patterns are connected to a positive terminal 25A. Further, the second surface layer pattern 28B and the second inner layer pattern 61B are electrically connected by a second conductive part 51B, and these patterns are connected to a negative terminal 25B. Therefore, the first and second holes 213A and 213B in the present modified example are holes that penetrate in the entire plate thickness direction and are through holes that electrically connect circuits of different wiring layers.

With the above configuration, the area of the pattern can be further increased by the area of the first and second inner layer patterns 61A and 61B. Because the area of the pattern can be increased, the wiring resistance can be further reduced.

The first and second conductive parts 51A and 51B may be made to connect more inner layer patterns, which can increase the area of the pattern, and therefore, the wiring resistance can be further reduced.

In the present modified example, the first and second holes 213A and 213B may be filled with a conductive resin as in the first embodiment.

The shapes of first and second holes 213A and 213B are not limited to the U-shape described in the first embodiment and the linear shape described in the second embodiment, and can be appropriately changed. A modified example of the shapes of the first and second holes 213A and 213B is described with reference to FIGS. 13A and 13B and FIGS. 14A and 14B. It should be noted that in FIGS. 13A and 13B and FIGS. 14A and 14B, the drawing of the configuration not directly related to the modified example described below is omitted as appropriate.

Figure 13A:
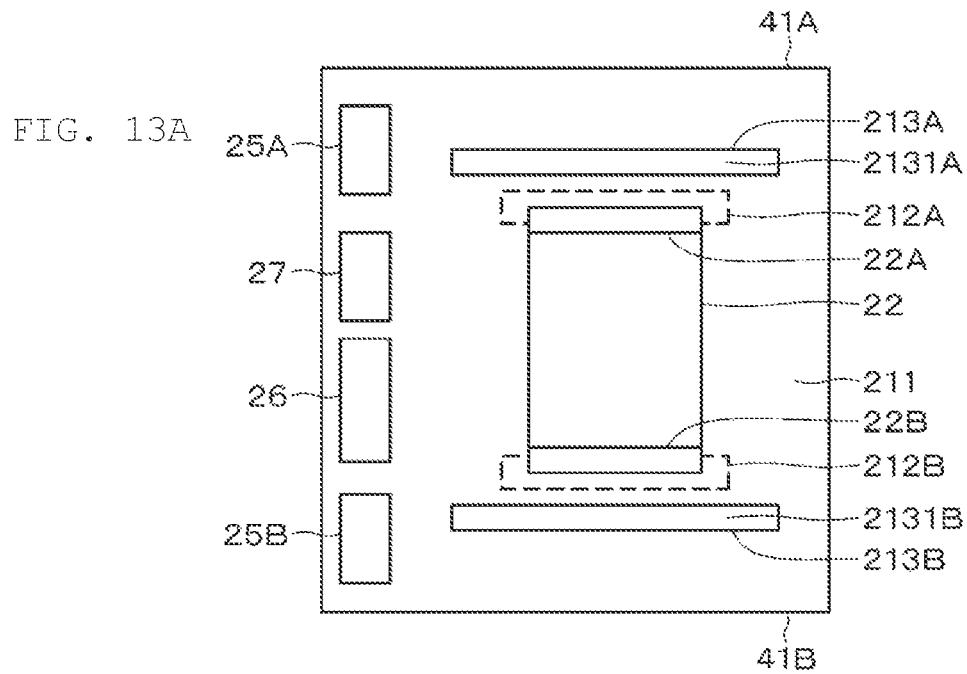
FIGS. 13A and 13B are diagrams for explaining the modified example.

As shown in FIG. 13A, a first hole 213A may have a shape having only a hole 2131A. Further, a second hole 213B may have a shape having only a hole 2131B. That is, the pair of strip-shaped holes substantially parallel to the short sides of the battery 22 may be the first and second holes 213A and 213B.

Holes other than the first and second holes 213A and 213B may be formed in a board body 211. For example, as shown in FIG. 13B, a strip-shaped third hole 71 connecting near the center between the end of the first hole 213A and the end of the second hole 213B may be formed in the board body 211.

Figure 13B:
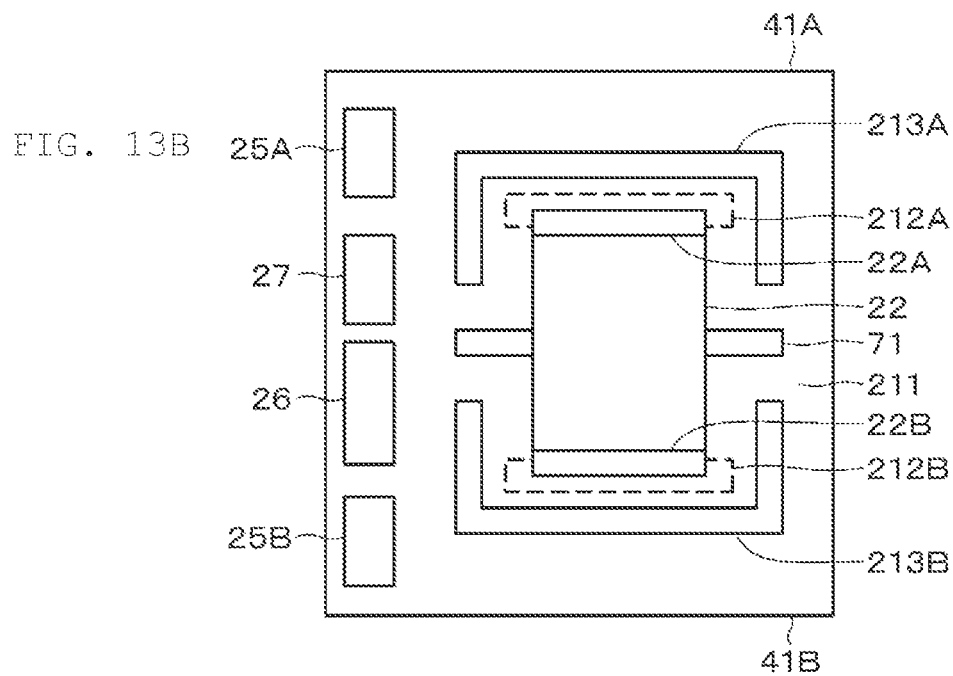
Figure 14A:
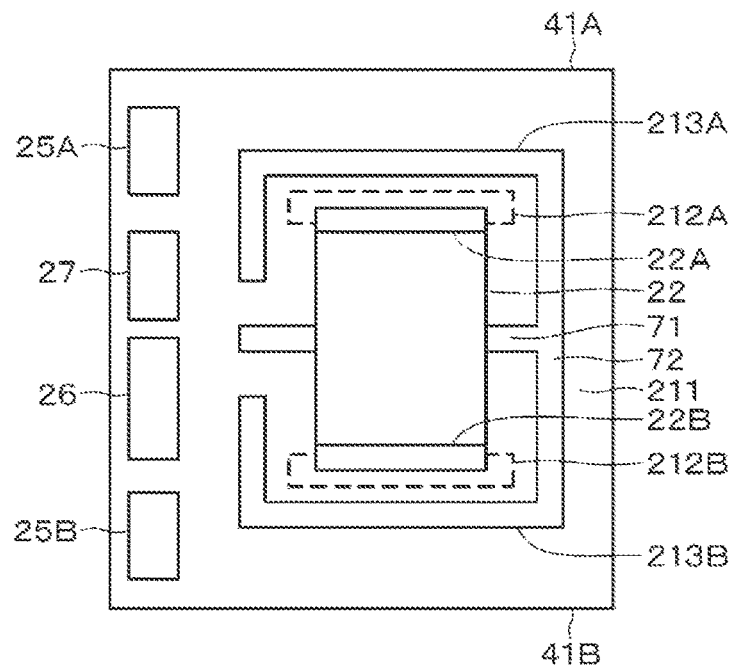
FIGS. 14A and 14B are diagrams for explaining the modified example.

In addition to the shape example shown in FIG. 13B, as shown in FIG. 14A, a strip-shaped fourth hole 72 provided so as to connect the ends of the first to third holes 213A, 213B, and 71 may be formed in the board body 211. According to the shape example of each of the holes shown in FIG. 14A, it becomes possible to reduce the area of a portion connecting an inner region defined by the first hole 213A, the second hole 213B, the third hole 71, and the fourth hole 72 (the region where the battery 22 is present) and an outer region other than the above, and the stress propagating to the battery 22 can be effectively reduced.

Figure 14B:
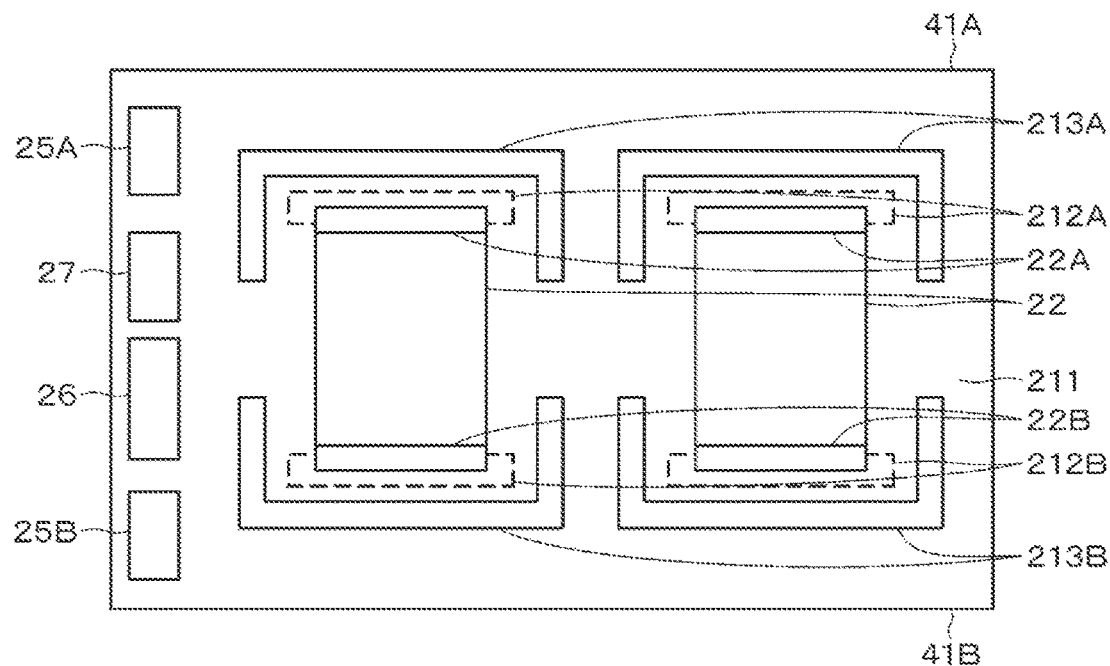

As shown in FIG. 14B, the plurality of batteries 22 (two in the illustrated example) may be provided on one surface of the board body 211, and the first and second holes 213A and 213B may be respectively provided around each of the batteries 22. The shape of the hole corresponding to each of the batteries 22 may be different from the others. Further, two pieces of the batteries 22 may be mounted on both sides (for example, opposite locations) of the board body 211, and the first and second holes 213A and 213B may be configured to reduce the stress applied to the two batteries.

Other modified examples are described. In the above-described embodiment, for example, in FIG. 6, a configuration in which the first and second holes 213A and 213B are filled with the first and second conductive resins 52A and 52B has been described. Although the above-described effects can be obtained by filling the hole with the conductive resin, a configuration in which the hole is not filled with the conductive resin can also be adopted.

Holes formed in the board body 211 (for example, the first and second holes 213A and 213B in the embodiment) may not penetrate all the layers of the board body 211, but may be non-through holes formed just sufficient to communicate with the wiring layer of each layer.

In the above-described embodiment, the case in which the board body 211 is a rigid board has been described, but the type of the board body 211 is not limited to this, and may be a flexible board, a rigid flexible board, or others.

In the above-described embodiment, the case in which the board 21 is flat has been described, but the shape of the board 21 is not limited to this, and the board 21 may be curved, bent, or have an irregular structure.

In the above-described embodiment, the case in which the exterior material is the exterior case 10 has been described, but the exterior material is not limited to this, and may be a laminated film or others.

In the above-described embodiment, the case in which the battery 22 has a thin plate shape has been described, but the shape of the battery 22 is not limited to this, and may have a sheet shape, a block shape, or other shapes.

In the above-described embodiment, the case in which the main face of the battery 22 is rectangular has been described, but the shape of the main surface of the battery 22 is not limited to this, and may have a circular shape, an elliptical shape, a polygonal shape other than a quadrangle, an indefinite shape, or other shapes.

Hereinafter, an application example in which the present technology is applied to a wristband type electronic device is described.

A wristband type electronic device, also called a smart band, is a device that is simply wrapped around the arm to enable acquisition of data on human activities such as the number of steps, a distance traveled, calories burned, an amount of sleep, and a heart rate, and data on the external environment such as temperature and humidity. Furthermore, the acquired data can be managed by such as a smartphone. Further, the electronic device may have a function of transmitting and receiving e-mails, and for example, can notify the user of an incoming e-mail with a light emitting diode (LED) lamp and/or vibration.

Figure 15:
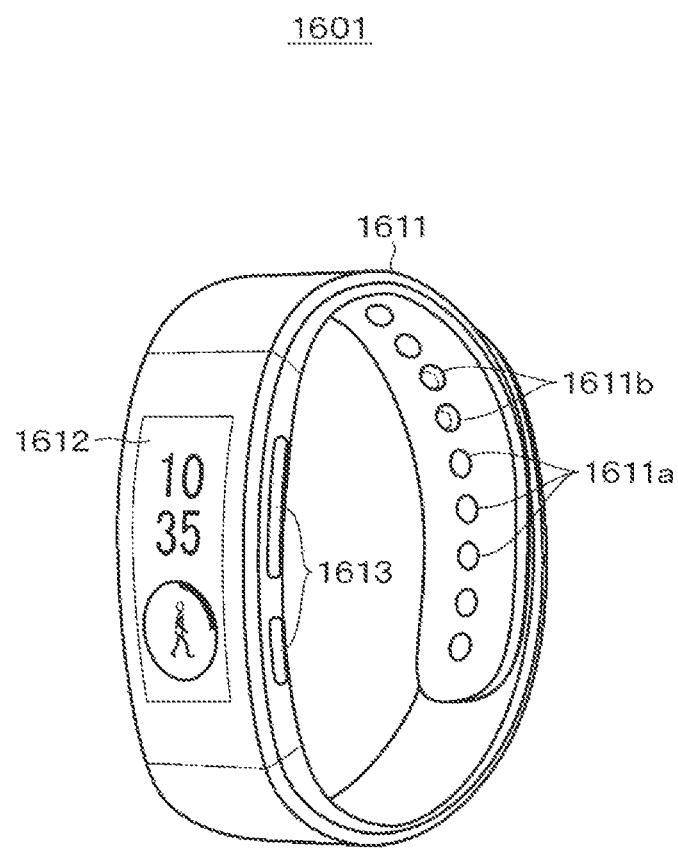
FIG. 15 is a diagram showing an external example of a wearable device according to an embodiment of the present technology.

FIG. 15 shows an external example of a wristband type electronic device 1601. The electronic device 1601 is a watch type wearable device that can be attached to and detached from the human body. The electronic device 1601 includes a band 1611 worn on the wrist, a display unit 1612 displaying numbers, characters, patterns, and the like, and an operation button 1613.

When in use, the electronic device 1601 is attached to the arm by making the band 1611 curve so as to be substantially circular as shown in FIG. 15, and by inserting protrusions 1611b into holes 1611a. A sensor (not shown) is provided at a portion or in the entire of the inside of the band 1611, and various types of data described above can be acquired. The sensor may be provided so as to be mounted on the circuit board on the display unit 1612 side.

Figure 16:
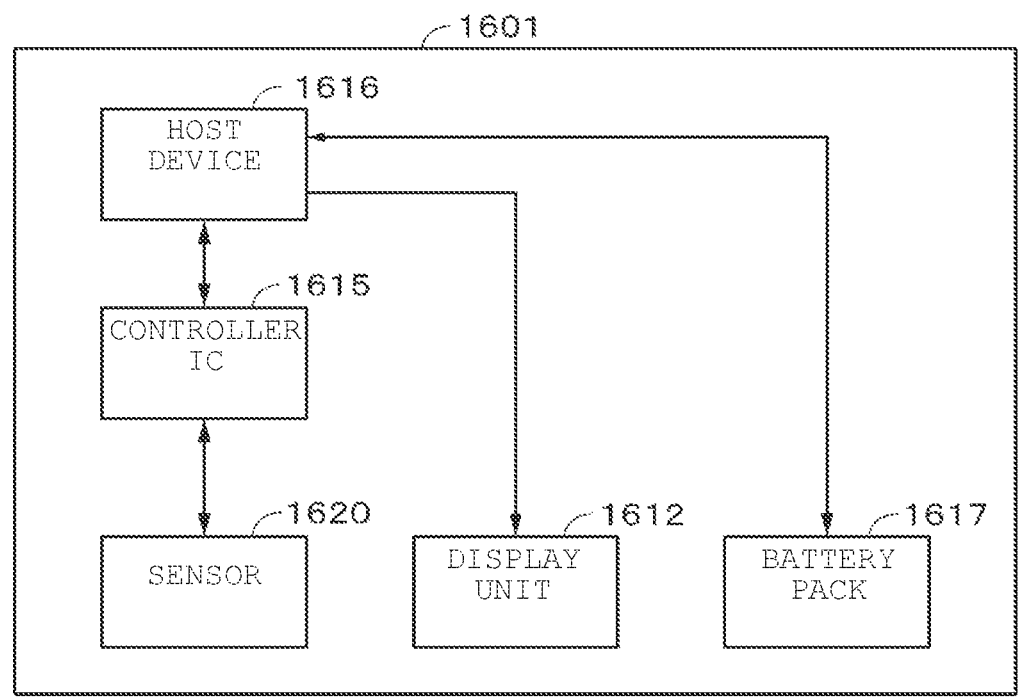
FIG. 16 is a diagram showing a circuit configuration of the wearable device according to an embodiment of the present technology.

FIG. 16 shows an example of a circuit configuration of the electronic device 1601. In addition to the display unit 1612 described above, the electronic device 1601 includes a controller IC 1615 as a drive control unit, a sensor 1620, a host device 1616, and a battery pack 1617 as a power source. The sensor 1620 may include the controller IC 1615.

The sensor 1620 is the one that can detect both pressing and bending. The sensor 1620 detects a change in capacitance in response to pressing, and outputs an output signal corresponding to the change to the controller IC 1615. Further, the sensor 1620 detects a change in resistance value (resistance change) according to bending, and outputs an output signal corresponding to the change (resistance change) to the controller IC 1615. The controller IC 1615 detects the pressing and bending of the sensor 1620 based on the output signals from the sensor 1620, and outputs information according to the detection result to the host device 1616.

The host device 1616 executes various types of processing based on the information supplied from the controller IC 1615. For example, processing such as displaying character information and image information on the display unit 1612, moving a cursor displayed on the display unit 1612, and scrolling a screen is executed.

The display unit 1612 is, for example, a flexible display unit that displays a screen based on such as a video signal or a control signal supplied from the host device 1616. Examples of the display unit 1612 include, but are not limited to, a liquid crystal display, an electro luminescence (EL) display, and electronic paper.

The battery pack 1617 is a battery pack according to the above-described embodiment or the modified example thereof, and has a power generating element mounting board 20.

The present technology can be applied to various electronic devices having a battery, and is not limited to the wristband type electronic device 1601 described in the above application example. Electronic devices other than the above-described application examples include, for example, notebook personal computers, tablet computers, mobile phones (including smartphones), personal digital assistants (PDAs), display units (LCDs, EL displays, electronic paper, etc.), imaging devices (digital still cameras, digital video cameras, etc.), audio devices (such as portable audio players), game devices, universal credit cards, sensor network terminals, smart watches, glasses type terminals (such as head mount display (HMD)), cordless phone handsets, electronic books, electronic dictionaries, radios, headphones, navigation systems, memory cards, pacemakers, hearing aids, power tools, electric shavers, refrigerators, air conditioners, televisions, stereo sets, water heaters, microwave ovens, dish washers, washing machines, dryers, lighting devices, toys, medical devices, robots, road conditioners, traffic lights, and others, but are not limited to these.

Figure 17:
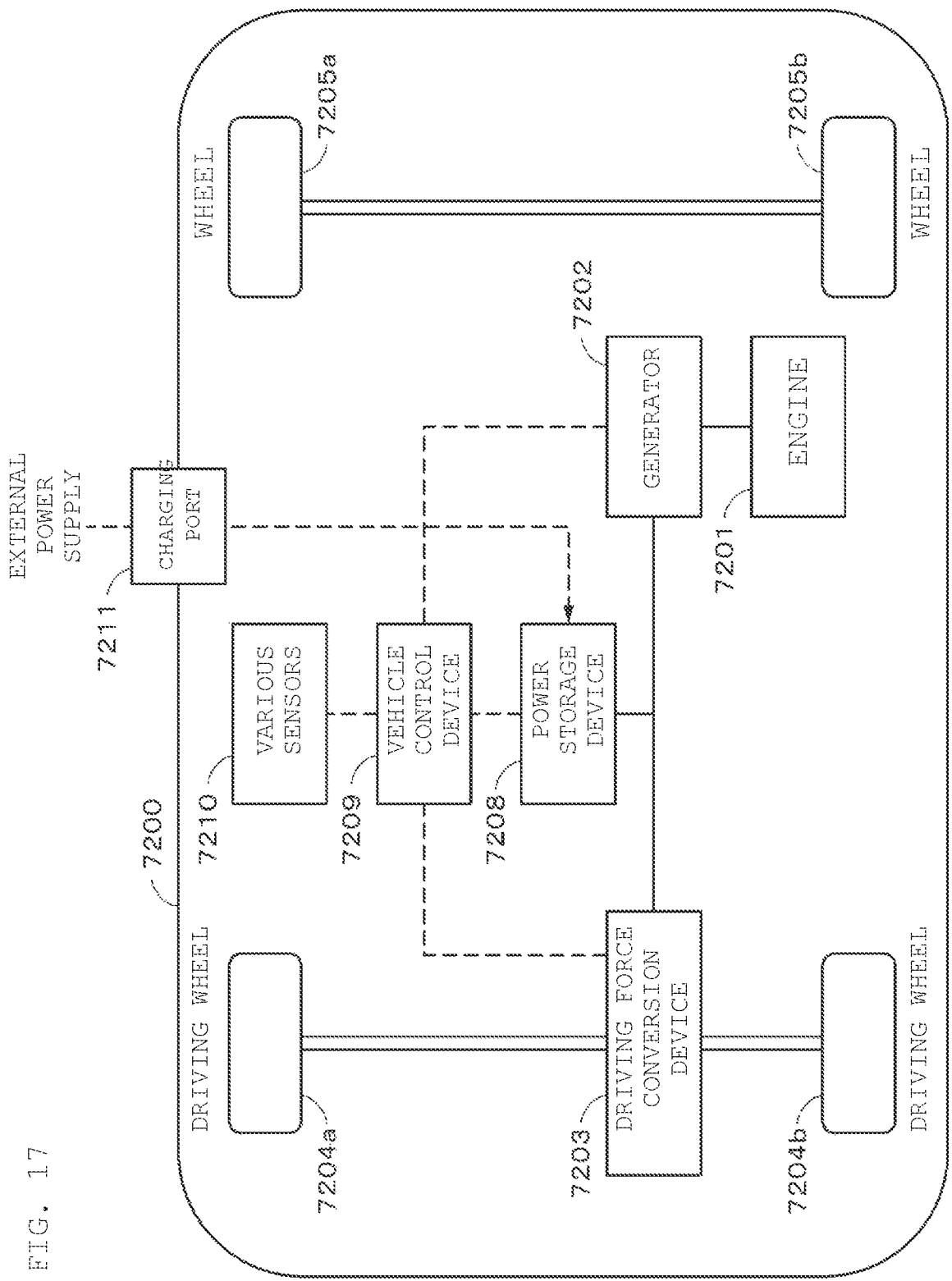
FIG. 17 is a diagram showing a configuration example of an electric vehicle according to an embodiment of the present technology.

An example in which the present technology is applied to a power storage system for a vehicle is described with reference to FIG. 17. FIG. 17 schematically shows a configuration of a hybrid vehicle that employs a series hybrid system to which the present technology is applied. The series hybrid system is a vehicle that travels on a power/driving force conversion device using electric power generated by a generator driven by an engine or electric power once stored in a battery.

The hybrid vehicle 7200 is mounted with an engine 7201, a generator 7202, a power/driving force conversion device 7203, a driving wheel 7204*a*, a driving wheel 7204*b*, a wheel 7205*a*, a wheel 7205*b*, a power storage device 7208, a vehicle control device 7209, various sensors 7210, and a charging port 7211. The power storage device 7208 has a battery pack (battery pack having the power generating element mounting board 20) of any one of the above-described embodiments and its modified examples.

The hybrid vehicle 7200 travels using the power/driving force conversion device 7203 as a power source. An example of the power/driving force conversion device 7203 is a motor. The power/driving force conversion device 7203 operates by the electric power of the power storage device 7208, and rotational force of the power/driving force conversion device 7203 is transmitted to the driving wheels 7204*a* and 7204*b*. By using direct current-alternating current (DC-AC) or reverse conversion (AC-DC conversion) at necessary places, the power/driving force conversion device 7203 can be applied to either an AC motor or a DC motor. The various sensors 7210 control the engine speed through the vehicle control device 7209, and control the opening of a not-shown throttle valve (throttle opening). The various sensors 7210 include a speed sensor, an acceleration sensor, an engine speed sensor, and others.

The rotational force of the engine 7201 is transmitted to the generator 7202, and the electric power generated by the generator 7202 using the rotational force can be stored in the power storage device 7208.

When the hybrid vehicle decelerates by a not-shown braking mechanism, resistance force at the time of deceleration is applied to the power/driving force conversion device 7203 as rotational force, and the regenerative electric power generated by the power/driving force conversion device 7203 by this rotational force is accumulated in the power storage device 7208.

The power storage device 7208 can be connected to an external power source of the hybrid vehicle to receive electric power from the external power source using the charging port 7211 as an input port, and can store the received electric power.

Although not shown, there may be provided an information processing device that performs information processing on vehicle control based on information regarding the secondary battery. Examples of such an information processing device include, for example, a battery level display device.

In the above, the description has been made on the series hybrid vehicle as an example which travels by the motor, using electric power generated by the generator driven by an engine or electric power once stored in a battery. However, the present technology can be effectively applied for a parallel hybrid vehicle that uses output from both an engine and a motor as drive sources, and in which three modes including traveling only with the engine, traveling only with the motor, and traveling with the engine and the motor are switched as appropriate. Furthermore, the present technology can be effectively applied to a so-called electric vehicle that travels only by a drive motor and without using an engine.

The example of the hybrid vehicle 7200 to which the technique according to the present technology can be applied has been described above. The technique according to the present technology can be suitably applied to the power storage device 7208 among the configurations described above.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A power generating element mounting board, comprising:
    a power generating element having a first terminal and a second terminal; and
    a board having a first board terminal connected with the first terminal, a second board terminal connected with the second terminal, and at least a first hole and a second hole, wherein
    the first hole includes a first conductive part provided on a surface of the first hole,
    the first hole includes a first strip-shaped hole,
    the second hole includes a second conductive part provided on a surface of the second hole,
    the second hole includes a second strip-shaped hole,
    the first hole is provided between the first board terminal and a first outer edge of the board, and
    the second hole is provided between the second board terminal and a second outer edge of the board, and wherein
    a length of the first strip-shaped hole is equal to or greater than a length of a short side of the power generating element, and
    a length of the second strip-shaped hole is equal to or greater than the length of the short side of the power generating element.

2. The power generating element mounting board according to claim 1, wherein
the first hole and the second hole are respectively filled with a conductive resin or inserted with an elastic body having conductivity.

3. The power generating element mounting board according to claim 1, wherein
the board is formed by laminating at least a first board having a first surface layer pattern corresponding to the first terminal and a second surface layer pattern corresponding to the second terminal, and a second board having a first inner layer pattern corresponding to the first terminal and a second inner layer pattern corresponding to the second terminal, and
the first conductive part connects the first surface layer pattern and the first inner layer pattern, and the second conductive part connects the second surface layer pattern and the second inner layer pattern.

4. The power generating element mounting board according to claim 1, wherein
the first board terminal has a distance to the first hole less than a distance from the first hole to the first outer edge, and the second board terminal has a distance to the second hole less than a distance from the second hole to the second outer edge.

5. The power generating element mounting board according to claim 1, wherein
the power generating element has a rectangular shape when viewed from above, and
the first terminal and the second terminal are provided at one of positions of opposing long sides and opposing short sides.

6. The power generating element mounting board according to claim 1, comprising a plurality of the power generating elements, wherein
the first hole and the second hole are respectively provided around each of the power generating elements.

7. The power generating element mounting board according to claim 1, wherein
each of the first hole and the second hole has a shape that is substantially symmetrical with respect to a predetermined reference line.

8. The power generating element mounting board according to claim 1, comprising
a second power generating element different from the power generating element, wherein
the second power generating element has a third terminal and a fourth terminal,
the board has a third board terminal to which the third terminal is connected and a fourth board terminal to which the fourth terminal is connected,
the first hole is provided between the first board terminal and the third board terminal, and
the second hole is provided between the second board terminal and the fourth board terminal.

9. The power generating element mounting board according to claim 1, wherein
the power generating element includes an all-solid-state battery.

10. A battery pack comprising the power generating element mounting board according to claim 1.

11. An electronic device comprising the battery pack according to claim 10.

12. An electric vehicle comprising the battery pack according to claim 10.

13. The power generating element mounting board according to claim 1, wherein
the first strip-shaped hole is substantially parallel to the first outer edge of the board, and
the second strip-shaped hole is substantially parallel to the second outer edge of the board.

14. A power generating element mounting board, comprising:
a power generating element having a first terminal and a second terminal; and
a board having a first board terminal connected with the first terminal, a second board terminal connected with the second terminal, and at least a first hole and a second hole, wherein
the first hole includes a first conductive part provided on a surface of the first hole,
the second hole includes a second conductive part provided on a surface of the second hole,
the first hole is provided between the first board terminal and a first outer edge of the board,
the second hole is provided between the second board terminal and a second outer edge of the board, and
the first hole and the second hole have a U-shape and whose ends are arranged so as to face each other, and wherein
the first hole includes a first hole part a second hole part, and a third hole part,
a length of the first hole part is equal to or greater than a length of a short side of the power generating element,
from both ends of the first hole part, the second hole part and the third hole part are formed so as to be substantially orthogonal to an extending direction of the first hole part and extend in a direction toward an inside of the board,
the second hole includes a fourth hole part, a fifth hole part, and a sixth hole part,
a length of the fourth hole part is equal to or greater than the length of the short side of the power generating element, and
from both ends of the fourth hole part, the fifth hole part and the sixth hole part are formed so as to be substantially orthogonal to an extending direction of the fourth hole part and extend in the direction toward the inside of the board.

15. The power generating element mounting board according to claim 14, wherein the board has a strip-shaped third hole connecting near a center between an end of the first hole and an end of the second hole.

16. The power generating element mounting board according to claim 15, wherein the board has a strip-shaped fourth hole provided so as to connect ends of the first hole, the second hole and the third hole.

17. The power generating element mounting board according to claim 14, wherein the board has a strip-shaped third hole connecting near a center between an end of the first hole and an end of the second hole.

* * * * *